(12) United States Patent
Lin

(10) Patent No.: US 8,665,349 B2  
(45) Date of Patent: Mar. 4, 2014

(54) METHOD OF SIMULATING SHORT DEPTH OF FIELD AND DIGITAL CAMERA USING THE SAME

(75) Inventor: Chia-Ho Lin, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 25 days.

(21) Appl. No.: 13/430,721

(22) Filed: Mar. 27, 2012

(65) Prior Publication Data

US 2012/0293690 A1 Nov. 22, 2012

(30) Foreign Application Priority Data

May 16, 2011 (TW) .............................. 100117036 A

(51) Int. Cl.  
*H04N 5/262* (2006.01)

(52) U.S. Cl.  
USPC .................. 348/239; 348/222.1; 348/349

(58) Field of Classification Search  
USPC ........................ 348/222.1, 239, 349  
See application file for complete search history.

(56) References Cited

U.S. PATENT DOCUMENTS

| | | | |
|---|---|---|---|
| 2008/0259154 A1* | 10/2008 | Garrison et al. | 348/14.01 |
| 2010/0259670 A1* | 10/2010 | Mohan et al. | 348/349 |
| 2011/0229052 A1* | 9/2011 | Li et al. | 382/264 |

* cited by examiner

*Primary Examiner* — Gevell Selby  
(74) *Attorney, Agent, or Firm* — Winston Hsu; Scott Margo

(57) ABSTRACT

A method of simulating short depth of field for a digital camera is disclosed. The method includes steps of detecting an object distance corresponding to a focus pixel, generating an original image according to the focus distance, and blurring a plurality of pixels of the original image to different extents according to a plurality of contrast values of the plurality of pixels, to generate an image with short depth of field.

16 Claims, 8 Drawing Sheets

METHOD OF SIMULATING SHORT DEPTH OF FIELD AND DIGITAL CAMERA USING THE SAME

BACKGROUND OF THE INVENTION

1. Field of the Invention

The present invention relates to a method of simulating short depth of field and digital camera using the same, and more particularly, to a method of simulating short depth of field and digital camera utilizing digital processing method to sharpen objects close to a focus and blur object far from the focus.

2. Description of the Prior Art

In general, a lens can only precisely focus the light on a spot with a certain distance, and thus the sharpness of an image of an object decreases gradually away from each side of the spot. Depth of field (DOF) is the distance between the nearest and farthest objects in a scene that appear acceptably sharp in an image for eyesight, so within the DOF, the unsharpness is imperceptible under normal viewing conditions.

Usually, consumer digital cameras have small aperture and long depth of field to make the entire image sharp, but the focused object can not be emphasized. On the contrary, single lens cameras have large aperture and short depth of field to sharp the focused object and blur the non-focused object, so as to emphasize the desirable object.

For example, please refer to FIG. 1, which is a schematic diagram of conventional image formations with a large aperture lens Len1 and a small aperture lens Len2, respectively. As shown in FIG. 1, the large aperture lens Len1 is designed for focusing light from an object 2a with an object distance D2 precisely on a film 100 to form an image 2a', and the small aperture lens Len2 is designed for focusing light from an object 2b with the object distance D2 precisely on an image sensor 102 to form an image 2b', wherein the image sensor 102 can be a charge coupled device (CCD) sensor or other image sensors. As can be seen from FIG. 1, light from objects 1a and 3a with an object distance D1 can not be precisely focused on the film 100, light from objects 1b and 3b with an object distance D3 can not be precisely focused on the image sensor 102 either, so the large aperture lens Len1 forms blurrier images 1a' and 3a' due to short depth of field, while the small aperture lens Len2 forms sharper images 1b' and 3b' due to long depth of field. Noticeably, the prior art changes an object distance with which light from an object can be precisely focused by moving the large aperture lens Len1 and the small aperture lens Len2.

Therefore, conventional digital cameras or camera phones usually utilize image processing to blur part of the image captured by the sensor 102 to emphasize a specific object. For example, in the conventional touch camera phones, users may touch the touch screen to define the object for emphasis, and then the touch camera phone can blur the image by a radial blur mode, that is, sharpness of the image is highest on the touched point and gradually decreases as distancing from the touched point. Or, users may select a horizontal line, and the touch camera phone blurs the image by a horizontal blur mode, i.e. sharpness of the image is highest on the horizontal line and decreases as distancing from the horizontal line.

However, the method of the conventional image processing is to blur part of the image within a certain region or by certain blur modes, and thus the sharpness of images of objects with a same object distance from the digital camera may be different after image processing, and the processed image has a lower quality compared with the image captured by a single lens camera with short depth of field. Besides, a lens with large aperture is manufactured with high cost, and thus not suitable for the consumer digital camera.

Moreover, the prior art can also simulate short depth of field by capturing two images, wherein one of the images is focused on a foreground and the other is focused on a background. Then, the conventional method separates the foreground image and the background image by image processing, and blurs the background image and blends the foreground image with the blurred background image through image processing techniques, such that the object in the foreground is emphasized and the background is de-emphasized. However, it needs to shoot two images for alignment before simulating short depth of field, which increases complexity. Besides, there are only two blurring levels in the image, i.e. the foreground image and the background image, which can not precisely present sense of distance.

According to mentioned disadvantages, there is a need to improve the prior art to utilize better image blurry method for simulating short depth of field image.

SUMMARY OF THE INVENTION

It is therefore an objective of the present invention to provide a method of simulating short depth of field and digital camera utilizing digital processing.

The present invention discloses a method of simulating short depth of field for a digital camera. The method of simulating short depth of field includes detecting an object distance corresponding to a focus pixel, generating an original image according to the object distance, and blurring a plurality of pixels to different extents according to a plurality of contrast values of the plurality of pixels of the original image to generate an image with short depth of field.

The present invention further includes a digital camera capable of simulating short depth of field. The digital camera includes a lens, a sensor for generating an original image according to an object distance, and an image processing chip. The image processing chip includes a detecting unit for detecting the object distance corresponding to a focus pixel, and a processing unit for blurring a plurality of pixels to different extents according to a plurality of contrast values of the plurality of pixels of the original image to generate an image with short depth of field.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
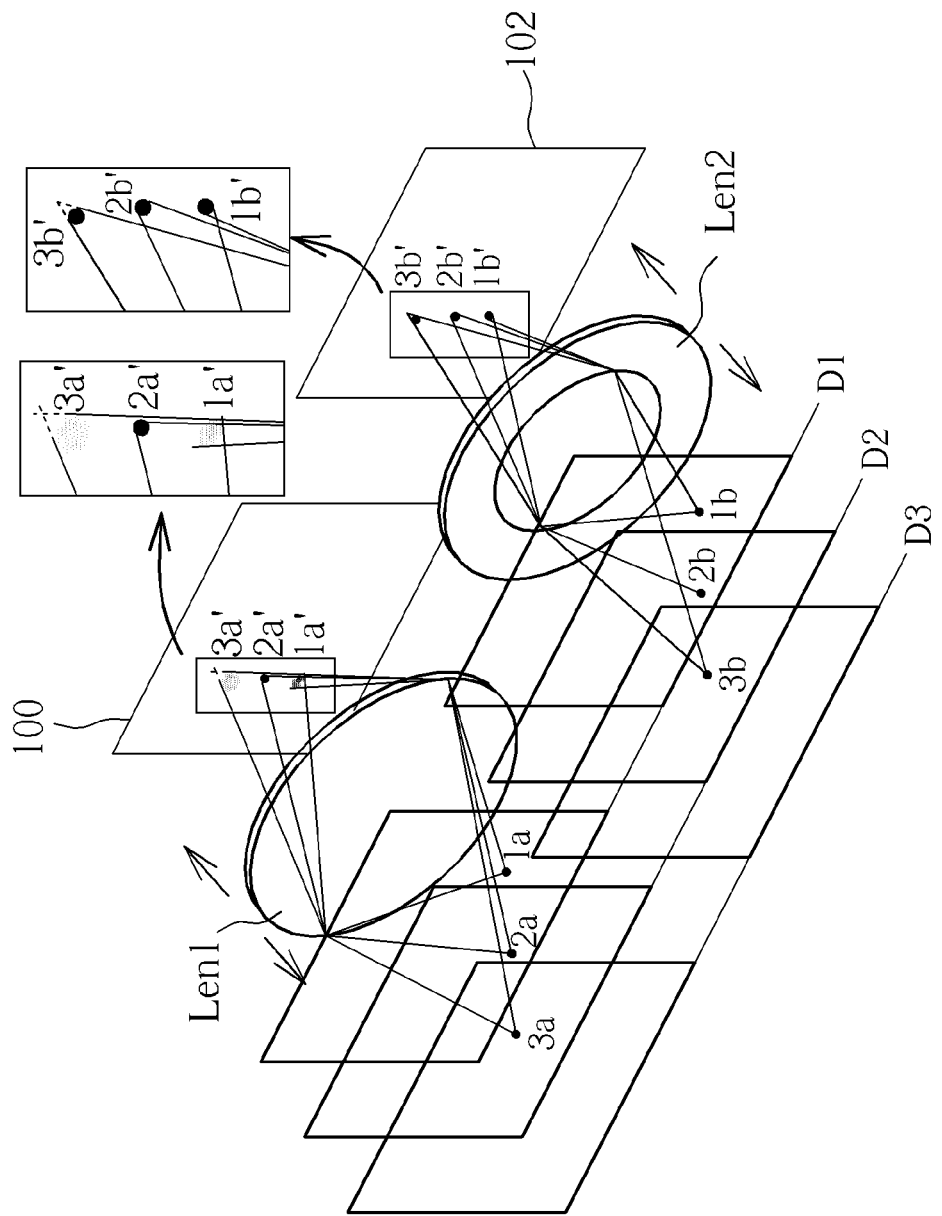
FIG. 1 is a schematic diagram of conventional image formations with a large aperture lens and a small aperture lens, respectively.
Figure 2:
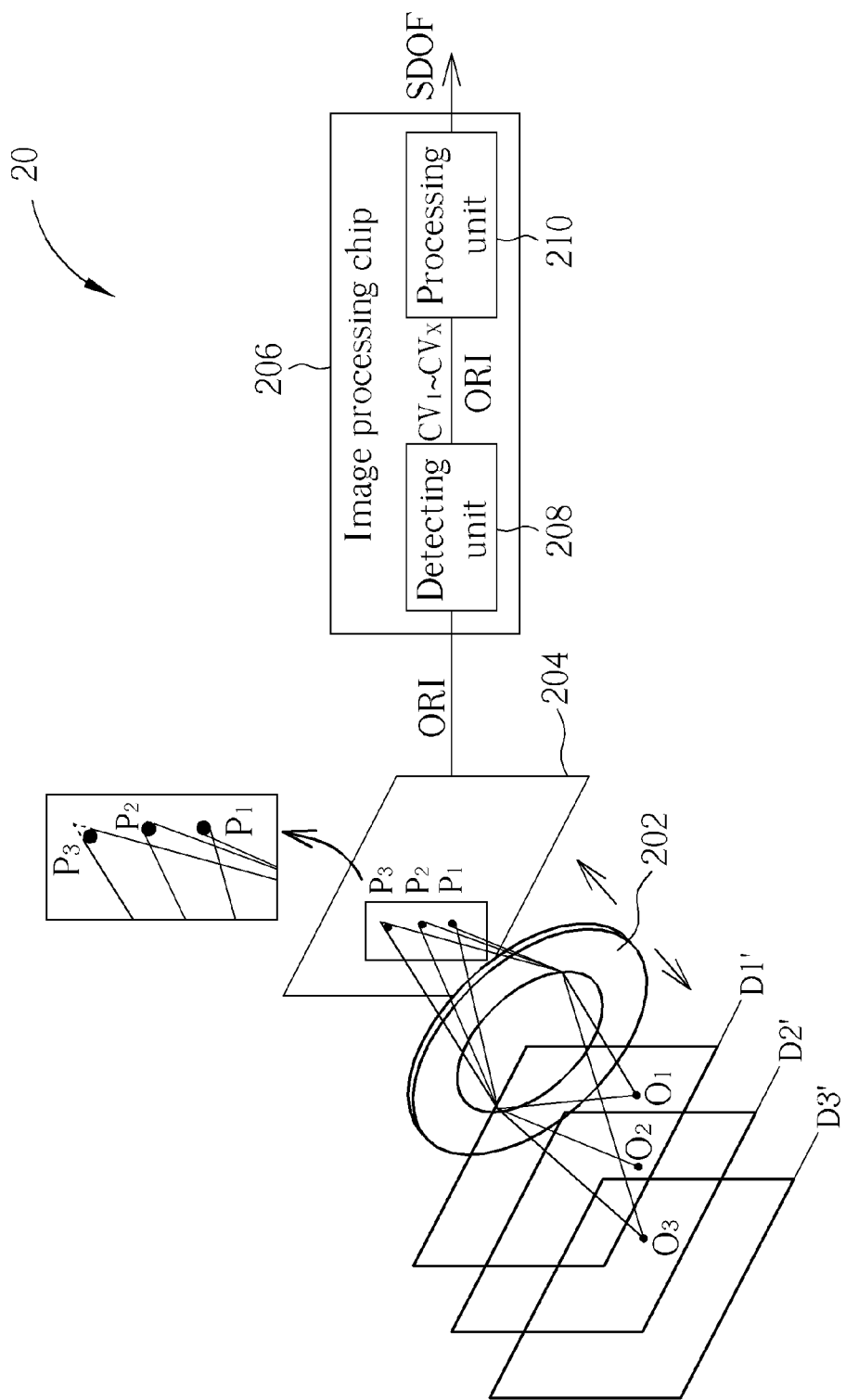
FIG. 2 is a schematic diagram of a digital camera according to an embodiment of the present invention.

Please refer to FIG. 2, which is a schematic diagram of a digital camera 20 according to an embodiment of the present invention. For simplicity, FIG. 2 only shows a lens 202, an image sensor 204 and an image processing chip 206 of the digital camera 20, while other components are omitted. The image processing chip 206 includes a detecting unit 208 and a processing unit 210, wherein the image sensor 204 can be an image sensor such as a charge coupled device (CCD) sensor and a complementary metal-oxide semiconductor (CMOS) sensor.

In short, the detecting unit 208 detects an object distance OD, e.g. an object distance D2', corresponding to a focus pixel FP, e.g. a pixel $P_2$. Then, the lens 202 is arranged such that light from an object with the object distance OD can be precisely focused on the image sensor 204, and thus the image sensor 204 can generate an original image ORI accordingly. The processing unit 210 further blurs whole pixels $P_1$-$P_x$ to different extents according to contrast values $CV_1$-$CV_x$ of focus information $FInfo_1$-$FInfo_x$ of the whole pixels $P_1$-$P_x$ of the original image ORI, to generate an image with short depth of field SDOF. As a result, the present invention allows objects with a same object distance having a same sharpness after image processing, and the image with short depth of field can be generated without a large aperture lens. In addition, compared with the prior art of simulating the short depth of field by shooting two images for image processing, the present invention only needs the one original image ROI to generate the image with different blurring levels according to different focus distances, such that the image with short depth of field SDOF can be generated more easily, to simulate an image captured by a real large aperture.

In detail, the lens 202 can move backward and forward to perform automatic focus, such that the detecting unit 208 detects a focus information FInfo of the focus pixel FP, and decides a distance corresponding to a maximum contrast values MaxCV of the focus information FInfo is the object distance OD corresponding to the focus pixel FP. Then, the image sensor 204 generates the original image ORI according to the object distance OD, and the processing unit 210 blurs the whole pixels of the original image ORI corresponding to the smaller contrast values $CV_1$-$CV_x$ of the focus information $FInfo_1$-$FInfo_x$ more, to generate the image with short depth of field SDOF.

Figure 3A:
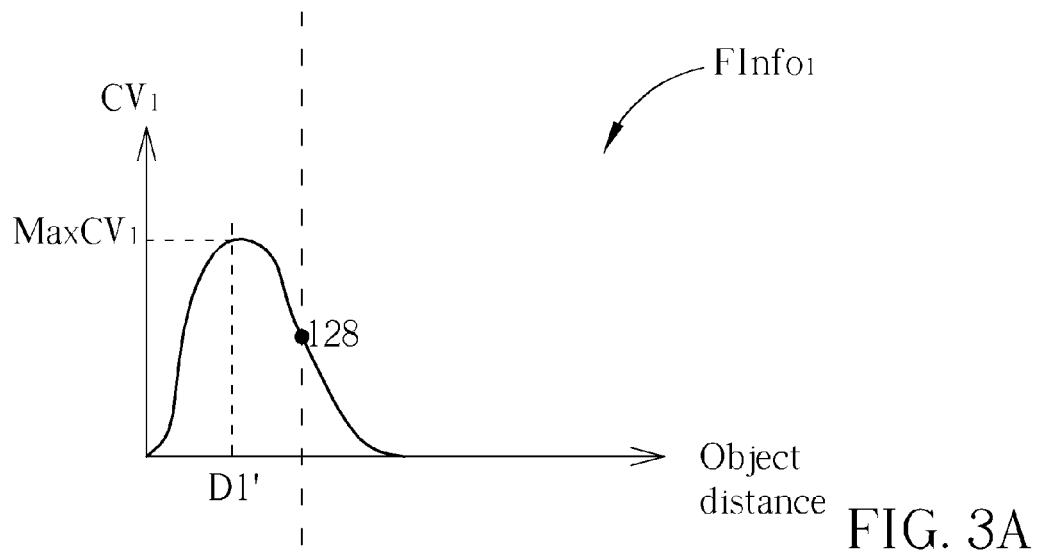
FIG. 3A to FIG. 3C are schematic diagrams of different contrast values of focus information of pixels shown in FIG. 2, respectively.
Figure 3B:
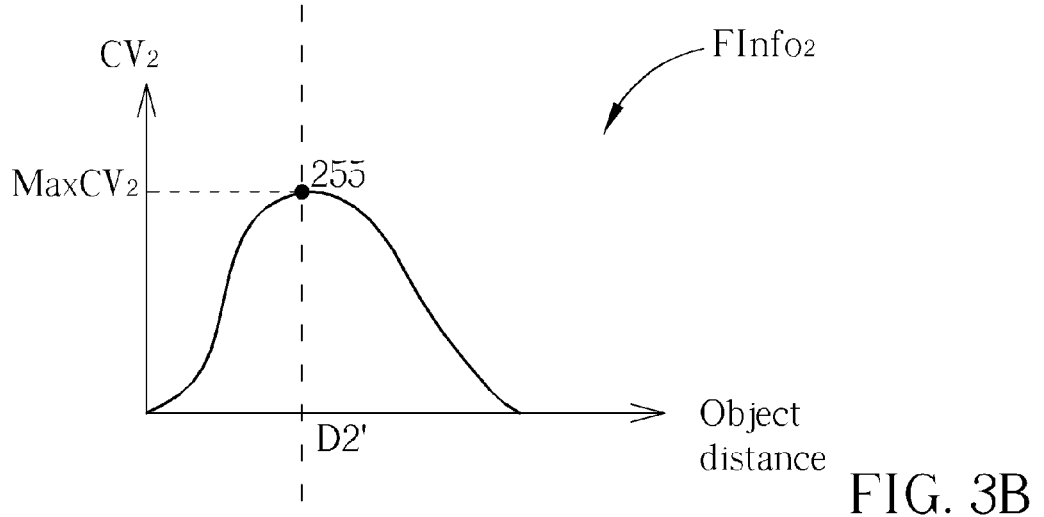
Figure 3C:
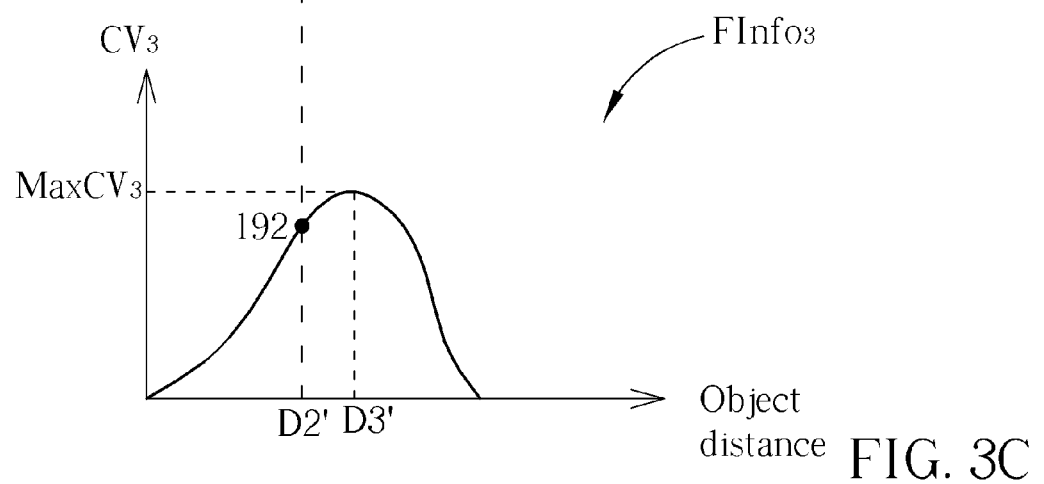

For example, please refer to FIG. 3A to FIG. 3C, which are schematic diagrams of contrast values $CV_1$, $CV_2$, $CV_3$ of focus information $FInfo_1$, $FInfo_2$, $FInfo_3$ of pixels $P_1$, $P_2$, $P_3$ shown in FIG. 2, respectively. FIG. 3A to FIG. 3C illustrates the lens 202 moves backward and forward to obtain contrast values, i.e. differences between a pixel and its neighboring pixels, for light from objects with different object distances to be precisely focused. As shown in FIG. 3B, if the pixel $P_2$ is selected as the focus pixel FP, the detecting unit 208 can decide a distance D2' corresponding to a maximum contrast values $MaxCV_2$ of the focus information $FInfo_2$ is the object distance OD corresponding to the focus pixel FP. In other words, since a distance between the lens 202 and an object $O_2$ corresponding to the pixel $P_2$ is the object distance D2', the contrast value $CV_2$ is a maximum when the lens 202 moves backward and forward to precisely focus light from the object $O_2$ with the object distance D2'.

Figure 4:
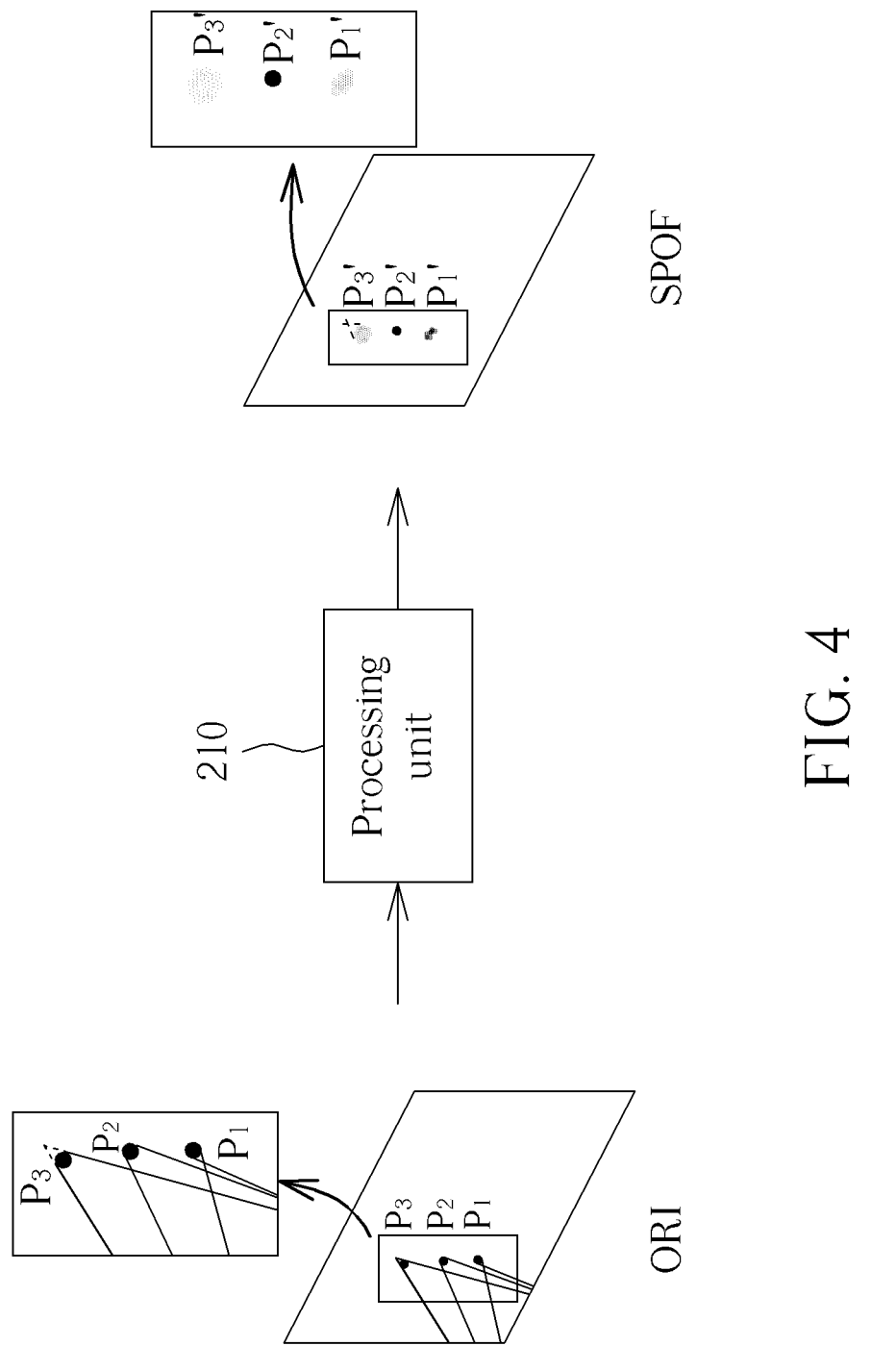
FIG. 4 is a schematic diagram of the original image and the image with short depth of field shown in FIG. 2.

Therefore, when the image sensor 204 generates the original image ORI according to the object distance D2', the contrast value $CV_2$ corresponding to the pixel $P_2$ is largest, e.g. 255, and the contrast value $CV_3$ corresponding to the pixel $P_3$ is second largest, e.g. 192, and the contrast value $CV_1$ corresponding to the pixel $P_1$ is smallest, e.g. 128. In such a situation, please refer to FIG. 4, which is a schematic diagram of the original image ORI and the image with short depth of field SDOF shown in FIG. 2. As shown in FIG. 4, the processing unit 210 keeps the pixel $P_2$ sharp, makes the pixel $P_3$ blurrier, and makes the pixel $P_1$ blurriest, to generate the pixels $P_1'$-$P_3'$ of the image with short depth of field SDOF. As a result, the present invention allows objects with a same object distance having a same sharpness after image processing, and the image with short depth of field can be generated without a large aperture lens, such that the image with short depth of field SDOF can be generated more easily, to simulate an image captured by a real large aperture.

Noticeably, the spirit of the present invention is to detect the object distance OD corresponding to the focus pixel FP via the focus information, so as to generate the original image ORI accordingly, and then the processing unit 210 blurs the whole pixels $P_1$-$P_x$ to different extents according to the contrast values $CV_1$-$CV_x$ of the focus information $FInfo_1$-$FInfo_x$ of the whole pixels $P_1$-$P_x$ of the original image ORI, to generate the image with short depth of field SDOF. Those skilled in the art should make modifications or alterations accordingly. For example, the focus pixel FP is not limited to the pixel $P_2$, and can be the pixel $P_1$, the pixel $P_3$, a central pixel, or a pixel of an object desired to be sharp. A method of detecting the object distance OD corresponding to the focus pixel FP is not limited to move the lens 202 and determine the object distance OD via the maximum contrast value MaxCV, and can be achieved by other distance measurement methods as well. In addition, since a number of the whole pixels $P_1$-$P_x$ within a shooting region is great in practice rather than only three pixels in the above embodiment, for simplification, the whole pixels $P_1$-$P_x$ can be distributed to pixel windows $PW_1$-$PW_y$, of the image sensor 204, and the focus pixel FP is located in a focus pixel window FPW.

In detail, the lens 202 can move backward and forward to perform automatic focus, such that the detecting unit 208 detects a focus information FWInfo of the focus pixel window FPW and decides a distance corresponding to a maximum total contrast value MaxSCV of the focus information FWInfo is the object distance OD corresponding to the focus pixel window FPW. Then, the image sensor 204 generates the original image ORI according to the object distance OD. The processing unit 210 performs Gaussian blur on the original image ORI to different extents, to generate Gaussian blur images $GBI_1$-$GBI_z$, respectively, and the processing unit 210 applies the original image ORI and the Gaussian blur images $GBI_1$-$GBI_z$ to the pixel windows $PW_1$-$PW_y$ according to the total contrast values $SCV_1$-$SCV_y$ of the pixel windows $PW_1$-$PW_y$ of the original image ORI, to generate the image with short depth of field SDOF.

Figure 5:
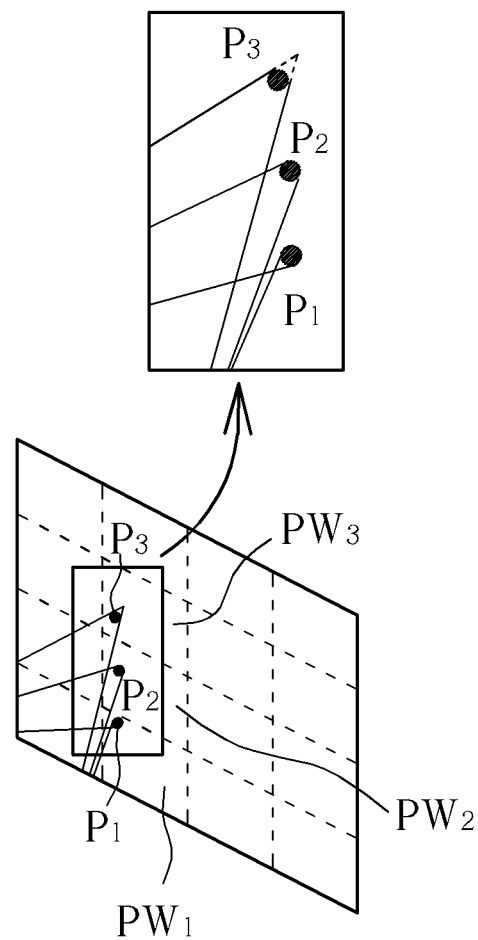
FIG. 5 is a schematic diagram of the image sensor including the pixel windows shown in FIG. 2.
Figure 6A:
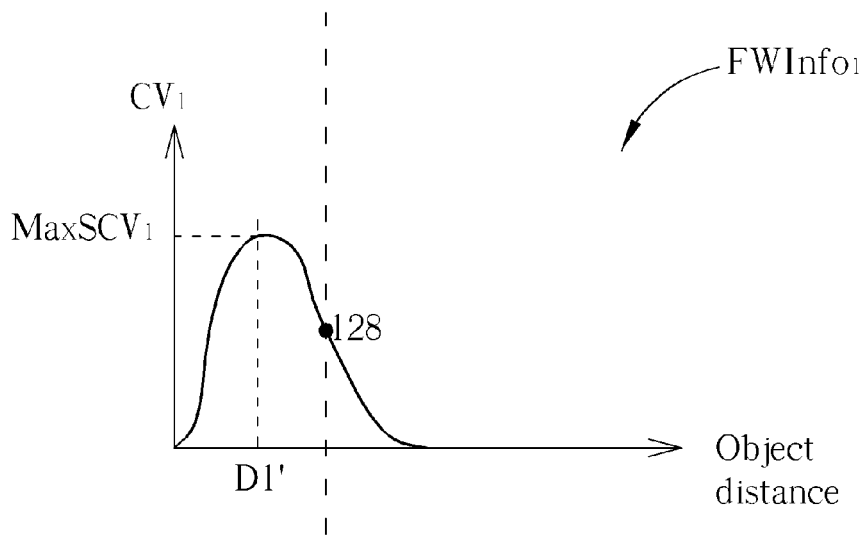
FIG. 6A to FIG. 6C are schematic diagrams of the total contrast values of the focus information of the pixel windows shown in FIG. 5, respectively.
Figure 6B:
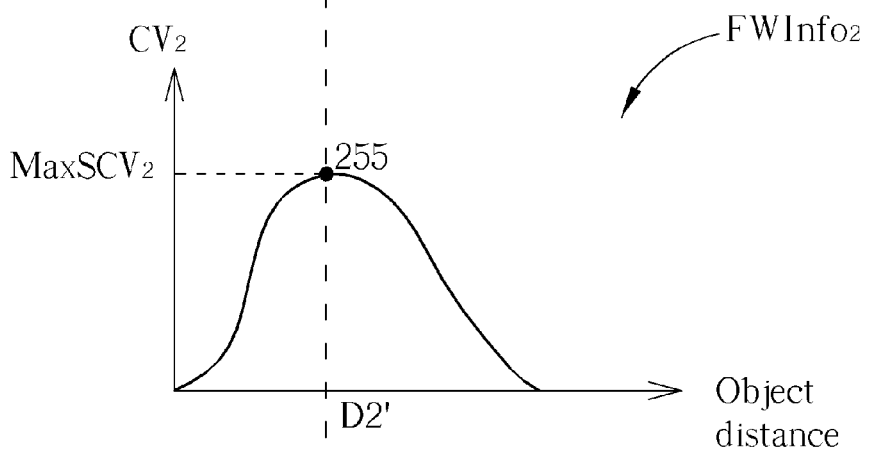
Figure 6C:
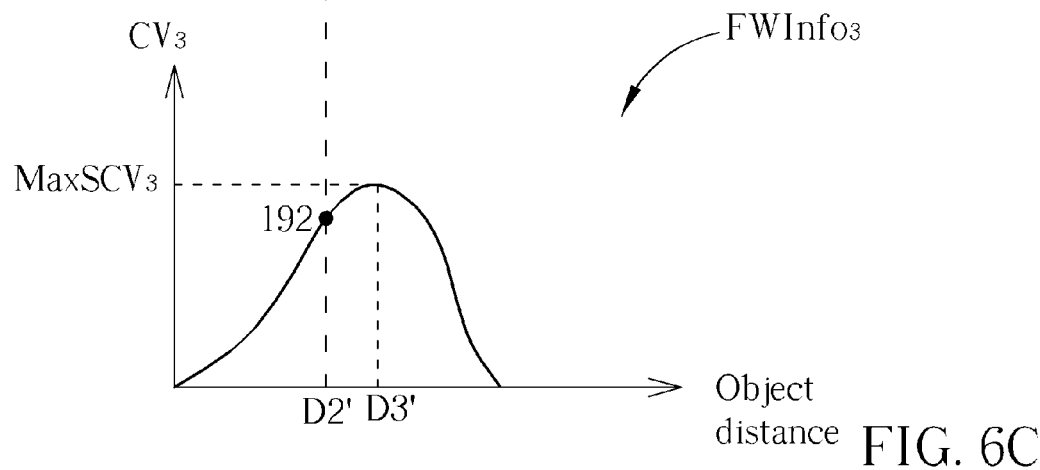

Please refer to FIG. 5, which is a schematic diagram of the image sensor 204 shown in FIG. 2 including the pixel windows $PW_1$-$PW_y$, e.g. 4 by 4 pixel windows. For example, please refer to FIG. 6A to FIG. 6C, which are schematic diagrams of the total contrast values $SCV_1$, $SCV_2$, $SCV_3$ of the focus information $FWInfo_1$, $FWInfo_2$, $FWInfo_3$ of the pixel windows $PW_1$-$PW_3$ shown in FIG. 5, respectively, wherein the pixel windows $PW_1$-$PW_3$ includes the pixels $P_1$, $P_2$, $P_3$, respectively. FIG. 6A to FIG. 6C illustrate the lens 202 moves backward and forward to obtain total contrast values, i.e. the sum of differences between each pixel and its neighboring pixels in the pixel window, for light from objects with different object distances to be precisely focused. As shown in FIG. 6B, if the pixel window $PW_2$ is selected as the focus pixel FPW, the detecting unit 208 decides the distance D2' corresponding to a maximum total contrast value $MaxSCV_2$ of the focus information $FWInfo_2$ is the object distance OD corresponding to the focus pixel FPW. In other words, since distances between the lens 202 and objects corresponding to the pixel window $PW_2$ are substantially the object distance D2', the total contrast value $SCV_2$ will be a maximum when the lens 202 moves backward and forward to precisely focus light from the object with the object distance D2'.

Figure 7:
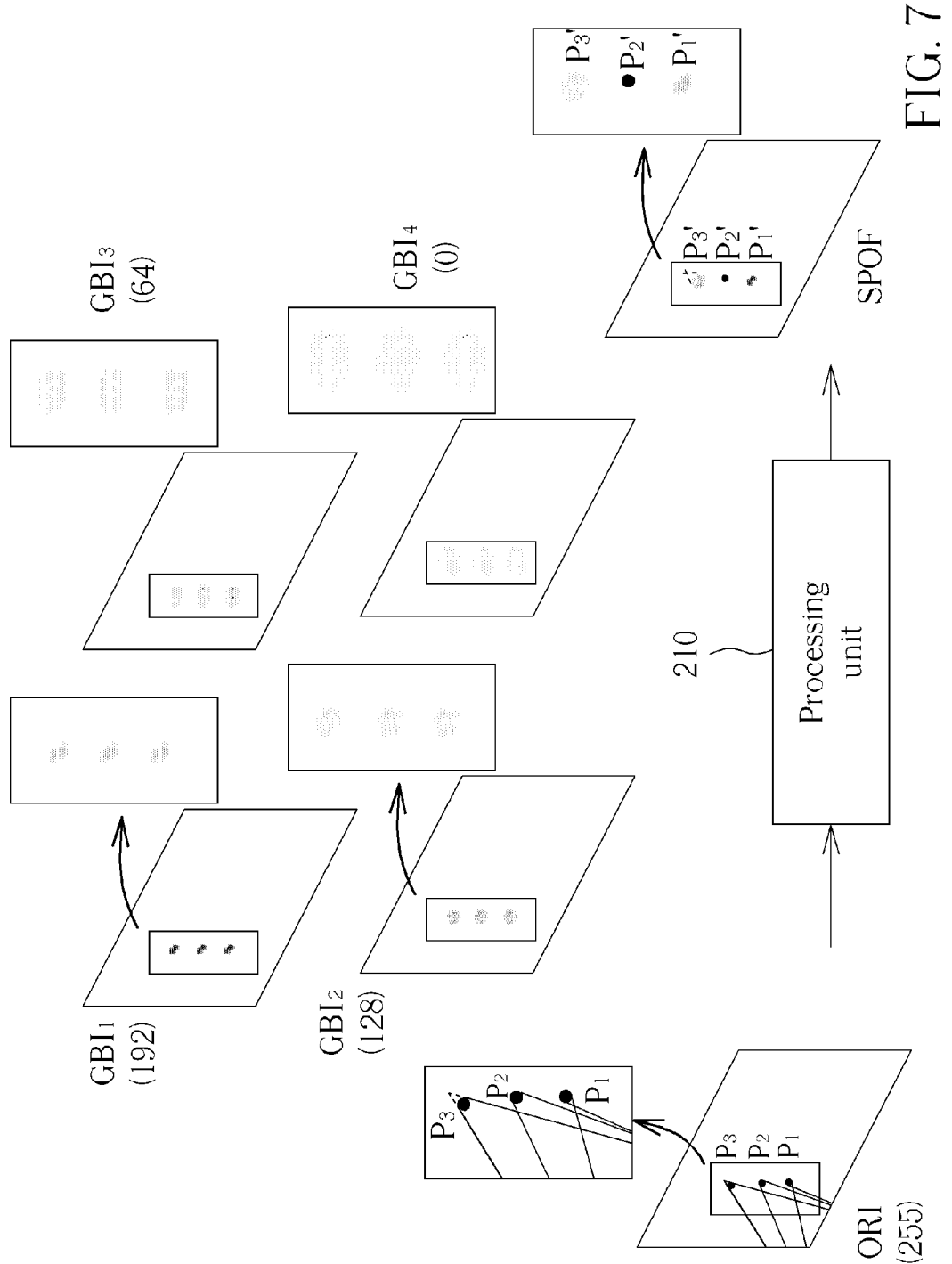
FIG. 7 is a schematic diagram of an operating principle of the processing unit shown in FIG. 2.

Therefore, when the image sensor 204 generates the original image ORI according to the object distance D2', the total contrast values $SCV_2$ corresponding to the pixel window $PW_2$ is largest, e.g. 255, and the total contrast values $SCV_3$ corresponding to the pixel window $PW_3$ is a second largest, e.g. 192, and the total contrast values $SCV_1$ corresponding to the pixel window $PW_1$ is smallest, e.g. 128. In such a situation, please refer to FIG. 7, which is a schematic diagram of operations of the processing unit 210. As shown in FIG. 7, the processing unit 210 performs Gaussian blur on the original image ORI to different extents, so as to generate the Gaussian blur images $GBI_1$-$GBI_4$, respectively, wherein the Gaussian blur image $GBI_1$ is the sharpest and the Gaussian blur image $GBI_4$ is the blurriest, and the processing unit 210 applies the original image ORI and Gaussian blur image $GBI_1$-$GBI_4$ to the pixel window $PW_1$-$PW_y$ according to the total contrast values $SCV_1$-$SCV_y$ of the pixel window $PW_1$-$PW_y$ of the original image ORI, to generate the image with short depth of field SDOF.

In detail, the processing unit 210 corresponds the original image ORI and the Gaussian blur image $GBI_1$-$GBI_4$ to specific total contrast values $SSCV_1$-$SSCV_a$, e.g. 255, 192, 128, 64 and 0, respectively, and the processing unit 210 applies the original image ORI and the Gaussian blur image $GBI_1$-$GBI_4$ to the pixel window $PW_1$-$PW_y$ according to the total contrast values $SCV_1$-$SCV_y$ of the pixel windows $PW_1$-$PW_y$ of the original image ORI and the specific total contrast values $SSCV_1$-$SSCV_a$, to generate the image with short depth of field SDOF. For example, if the total contrast values $SCV_1$-$SCV_3$ corresponding to the pixel windows $PW_1$-$PW_3$ are 128, 255 and 192, respectively, the pixel windows $PW_1'$-$PW_3'$ of the image with short depth of field SDOF can be obtained via applying the Gaussian blur image $GBI_2$, the original image ORI and the Gaussian blur image $GBI_1$ to the pixel windows $PW_1$-$PW_3$, respectively. As a result, the present invention allows objects with a same object distance having a same sharpness after image processing, such that the image with short depth of field SDOF can be generated more easily without a large aperture lens, and thus the image with short depth of field SDOF having more blurring extents can be generated more easily to simulate an image captured by a real large aperture.

Noticeably, if a total contrast value $SCV_4$ corresponding to a pixel window $PW_4$ is 224, which is not directly corresponding to any of the total contrast values $SCV_1$-$SCV_3$ corresponding to the original image ORI and the Gaussian blur image $GBI_1$-$GBI_4$, the original image ORI and the Gaussian blur image $GBI_1$ are interpolated with a proportion of 1:1 to apply to the pixel window $PW_4$. In addition, for avoiding distortion due to the window edge of the pixel window $PW_1$-$PW_y$, changing or sharpened too much, e.g. the total contrast values of a pixel window is high and thus the pixels of the window edge with lower contrast values are sharper than corresponding contrast values, the processing unit 210 can further perform alpha blending on window edges of the applied pixel window $PW_1$-$PW_y$, i.e. performs interpolation to the two edges of the windows, so as to generate the image with short depth of field SDOF, such that pixels with lower edge contrast values in an window edge of a pixel window with higher total contrast values can be blurrier, and thus more similar to a neighboring pixel window with a lower total contrast value.

Figure 8:
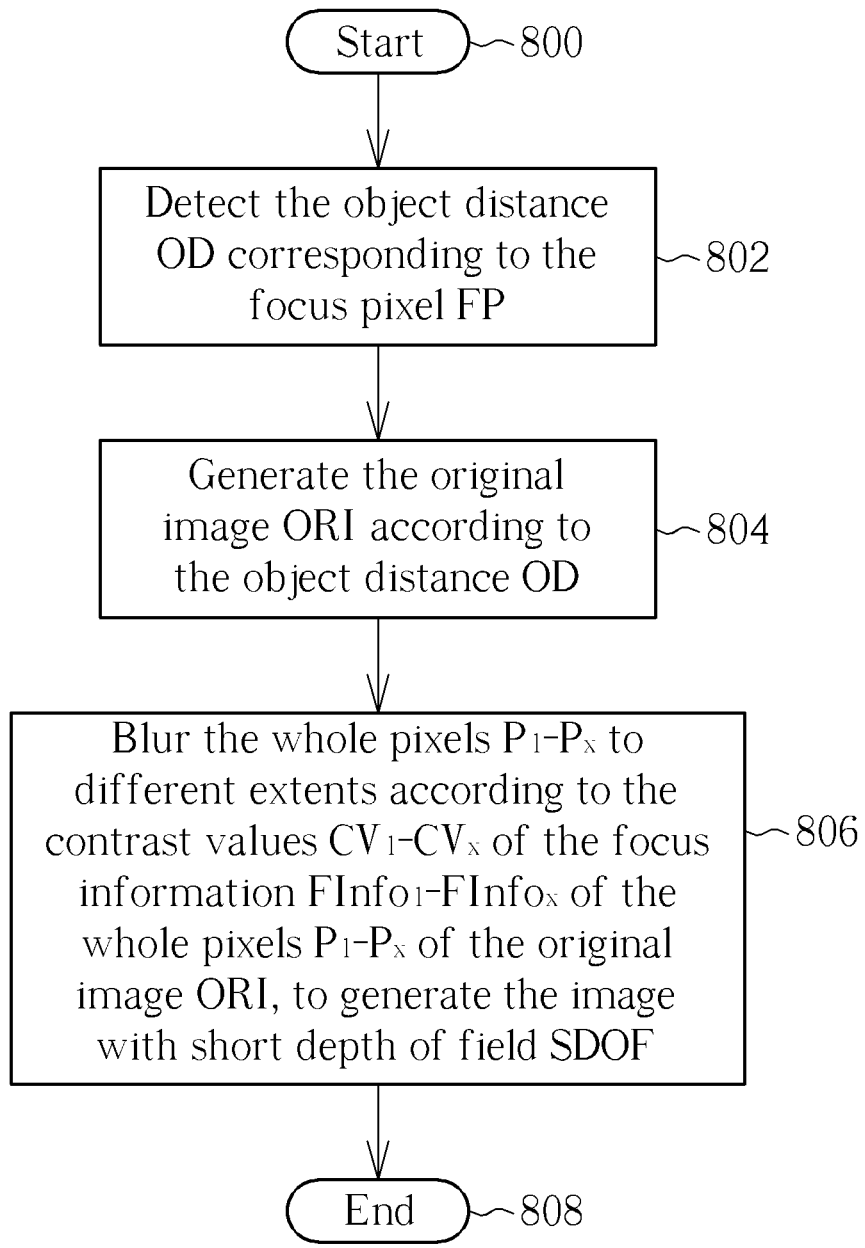
FIG. 8 is a schematic diagram of simulating short depth of field process 80 according to an embodiment of the present invention.

Therefore, operations of simulating short depth of field of the digital camera 20 can be summarized into a short depth of field simulation process 80 as shown in FIG. 8. The process 80 includes the following steps:

Step 800: Start.

Step 802: Detect the object distance OD corresponding to the focus pixel FP.

Step 804: Generate the original image ORI according to the object distance OD.

Step 806: Blur the pixels $P_1$-$P_x$ to different extents according to the contrast values $CV_1$-$CV_x$ of the focus information $FInfo_1$-$FInfo_x$ of the pixels $P_1$-$P_x$ of the original image ORI, to generate the image with short depth of field SDOF.

Step 808: End.

Details of the short depth of field simulation process 80 can be derived by referring to the above description.

The prior art blurs the image within a certain region or by certain blur modes, and thus the sharpness of images of objects with a same object distance from the digital camera may be different after image processing, and the processed image has a lower quality compared with the image captured by a single lens camera with short depth of field. Besides, a lens with large aperture is manufactured with high cost, and thus not suitable for the consumer digital camera. In addition, the method of shooting two images for blurring operations needs to perform alignment before simulating short depth of field, which increases complexity, and there are only two blurring levels in the image, i.e. the foreground image and the background image, which can not precisely present sense of distance.

In comparison, the present invention performs blurring on the pixel to different extents according to the distance-related contrast values of the focus information to generate the image with short depth of field, such that the object with a same object distance has a same sharpness after image processing, and the image with short depth of field can be generated without a large aperture lens. The present invention only needs the one original image ROI to generate the image with different blurring levels according to different focus distances, such that the image with short depth of field SDOF having more blurring levels can be generated more easily, so as to simulate an image captured by a real large aperture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of simulating short depth of field for a digital camera, comprising:
   detecting an object distance corresponding to a focus pixel;
   generating an original image according to the focus distance; and
   blurring a plurality of pixels of the original image to different extents according to a plurality of contrast values of a plurality of focus information of the plurality of pixels to generate an image with short depth of field.

2. The method of simulating short depth of field of claim 1, wherein the step of detecting an object distance corresponding to the focus pixel comprises:
   moving a lens of the digital camera to detect a first focus information of the focus pixel; and
   deciding a first distance corresponding to a maximum contrast value of the first focus information is the object distance corresponding to the focus pixel.

3. The method of simulating short depth of field of claim 1, wherein the step of blurring the plurality of pixels of the original image to the different extents according to the plurality of contrast values of the plurality of focus information of the plurality of pixels to generate the image with short depth of field comprises:
   blurring pixels of the plurality of pixels of the original image corresponding to smaller contrast values of the plurality of focus information more, to generate the image with short depth of field.

4. The method of simulating short depth of field of claim 1 further comprising:
   distributing the plurality of pixels into a plurality of pixel windows, wherein the focus pixel is in a focus pixel window.

5. The method of simulating short depth of field of claim 4, wherein the step of detecting the object distance corresponding to the focus pixel comprises:
   moving a lens of the digital camera to detect a second focus information of the focus pixel window; and
   deciding a second distance corresponding to a maximum total contrast value of the second focus information is the object distance corresponding to the focus pixel window.

6. The method of simulating short depth of field of claim 5, wherein the step of blurring the plurality of pixels of the original image to the different extents according to the plurality of contrast values of the plurality of focus information of the plurality of pixels to generate the image with short depth of field comprises:
   performing Gaussian blur on the original image to different extents, to generate a plurality of Gaussian blur images, respectively; and
   applying the original image and the plurality of Gaussian blur images to the plurality of pixel windows according to a plurality of total contrast values of the plurality of pixel windows of the original image to generate the image with short depth of field.

7. The method of simulating short depth of field of claim 6, wherein the step of applying the original image and the plurality of Gaussian blur images to the plurality of pixel windows according to the plurality of total contrast values of the plurality of pixel windows of the original image to generate the image with short depth of field comprises:
   corresponding the original image and the plurality of Gaussian blur images with a plurality of specific total contrast values, respectively; and
   applying the original image and the plurality of Gaussian blur images to the plurality of pixel windows according to the plurality of total contrast values of the plurality of pixel windows of the original image and the plurality of specific total contrast values to generate the image with short depth of field.

8. The method of simulating short depth of field of claim 6, wherein the step of applying the original image and the plurality of Gaussian blur images to the plurality of pixel windows according to the plurality of total contrast values of the plurality of pixel windows of the original image to generate the image with short depth of field comprises:
   applying the original image and the plurality of Gaussian blur images to the plurality of pixel windows according to the plurality of total contrast values of the plurality of pixel windows of the original image; and
   performing alpha blending on a plurality of window edges between the applied plurality of pixel windows to generate the image with short depth of field.

9. A digital camera capable of simulating short depth of field, comprising:
   a lens;
   an image sensor for generating an original image according to an object distance; and
   an image processing chip, comprising:
      a detecting unit for detecting the object distance corresponding to a focus pixel; and
      a processing unit for blurring the plurality of pixels to different extents according to a plurality of contrast values of a plurality of focus information of a plurality of pixels of an original image to generate a short depth of field image.

10. The digital camera of claim 9, wherein the detecting unit detects a first focus information of the focus pixel by moving the lens, and deciding a first distance corresponding to a maximum contrast value of the first focus information is the object distance corresponding to the focus pixel.

11. The digital camera of claim 9, wherein the processing unit blurs pixels of the plurality of pixels of the original image corresponding to smaller contrast values of the plurality of focus information more, to generate the image with short depth of field.

12. The digital camera of claim 9, wherein the plurality of pixels is distributed into a plurality of pixel windows of the image sensor, wherein the focus pixel is in a focus pixel window.

13. The digital camera of claim 12, wherein the lens moves to detect a second focus information of the focus pixel window, and decides a second distance corresponding to a maximum total contrast value of the second focus information is the object distance corresponding to the focus pixel window.

14. The digital camera of claim 13, wherein the processing unit performs Gaussian blur on the original image to different extents, to generate a plurality of Gaussian blur images, respectively, and applying the original image and the plurality of Gaussian blur images to the plurality of pixel windows according to a plurality of total contrast values of the plurality of pixel windows of the original image to generate the image with short depth of field.

15. The digital camera of claim 14, wherein the processing unit respectively corresponds the original image and the plurality of Gaussian blur images with a plurality of specific total contrast values, respectively, and applying the original image and the plurality of Gaussian blur images to the plurality of pixel windows according to the plurality of total contrast values of the plurality of pixel windows of the original image and the plurality of specific total contrast values to generate the image with short depth of field.

16. The digital camera of claim 13, wherein the processing unit applies the original image and the plurality of Gaussian blur images to the plurality of pixel windows according to the plurality of total contrast values of the plurality of pixel windows of the original image, and performing alpha blending on a plurality of window edges between the applied plurality of pixel windows to generate the image with short depth of field.

* * * * *